(12) United States Patent
Polozola et al.

(10) Patent No.: US 8,031,850 B2
(45) Date of Patent: Oct. 4, 2011

(54) SYSTEMS AND METHODS FOR VISITATION TERMINAL USER IDENTIFICATION

(75) Inventors: Michelle L. Polozola, Richardson, TX (US); Brian D. Waters, Dallas, TX (US)

(73) Assignee: Securus Technologies, Inc., Dallas, TX (US)

( * ) Notice: Subject to any disclaimer, the term of this patent is extended or adjusted under 35 U.S.C. 154(b) by 1348 days.

(21) Appl. No.: 11/562,784

(22) Filed: Nov. 22, 2006

(65) Prior Publication Data

US 2008/0118045 A1    May 22, 2008

(51) Int. Cl.
*H04M 1/60* (2006.01)
*H04M 17/00* (2006.01)
*H04W 40/00* (2009.01)
*G08B 13/14* (2006.01)

(52) U.S. Cl. ........ 379/167.14; 379/144.02; 379/68; 379/201.01; 379/188; 455/410; 455/411; 340/572.8

(58) Field of Classification Search .......... None
See application file for complete search history.

(56) References Cited

U.S. PATENT DOCUMENTS

| | | | | | |
|---|---|---|---|---|---|
| 3,848,112 | A | * | 11/1974 | Weichselbaum et al. | 235/375 |
| 6,084,513 | A | * | 7/2000 | Stoffer | 340/572.2 |
| 6,668,045 | B1 | * | 12/2003 | Mow | 379/88.19 |
| 6,795,540 | B1 | * | 9/2004 | Mow | 379/188 |
| 7,106,843 | B1 | * | 9/2006 | Gainsboro et al. | 379/191 |
| 7,348,888 | B2 | * | 3/2008 | Girvin et al. | 340/572.8 |
| 2001/0036821 | A1 | * | 11/2001 | Gainsboro et al. | 455/410 |
| 2002/0077077 | A1 | * | 6/2002 | Rezvani et al. | 455/410 |
| 2002/0163999 | A1 | * | 11/2002 | Farris et al. | 379/88.02 |
| 2006/0044769 | A1 | * | 3/2006 | Forster et al. | 361/760 |
| 2006/0245559 | A1 | * | 11/2006 | Hodge et al. | 379/88.19 |
| 2007/0036318 | A1 | * | 2/2007 | Gits et al. | 379/202.01 |
| 2007/0116214 | A1 | * | 5/2007 | Kitchin et al. | 379/111 |
| 2007/0200705 | A1 | * | 8/2007 | Yamagajo et al. | 340/572.7 |
| 2008/0174437 | A1 | * | 7/2008 | Arguin | 340/572.7 |

OTHER PUBLICATIONS

International Search Report for International Patent Application No. PCT/US 07/85174 dated May 16, 2008.
WIPIO, International Preliminary Report on Patentability, PCT/US2007/085174, May 26, 2009, Geneva, Switzerland.
USPTO, International Search Report, PCT/US2007/085174, May 16, 2008, Alexandria, Virginia.
USPTO, Written Opinion of the International Searching Authority, PCT/US2007/085174, May 16, 2008, Alexandria, Virginia.
U.S. Appl. No. 10/135,878, Viola et al.
U.S. Appl. No. 10/642,532, Robert L. Rae.
U.S. Appl. No. 10/720,848, Viola et al.
U.S. Appl. No. 11/125,842, Keiser et al.

* cited by examiner

*Primary Examiner* — Jennifer Mehmood
*Assistant Examiner* — Fekadeselassie Girma
(74) *Attorney, Agent, or Firm* — Fogarty, L.L.C.

(57) ABSTRACT

Systems and methods which collect information regarding users of controlled environment visitation terminals for identification of one or more parties to a visitation conversation are shown. Identifying information may be provided by various means, such as entry of a PIN, RFID, biometrics, etcetera. Embodiments provide a closed circuit visitation communication system in which a single port of a communication control system is used with respect to a pair of visitation terminals. Embodiments operate to prevent communication between a resident of a controlled environment facility and a visitor while identifying information is collected and verified. Thereafter, the resident and visitor may be placed in communication, whilst the identifying information may be utilized for such purposes as associating a recording of the conversation with the resident and/or visitor, issuing an alert to appropriate individuals that a conversation by one or more parties of interest is being conducted, collect investigative information, etcetera.

46 Claims, 2 Drawing Sheets

SYSTEMS AND METHODS FOR VISITATION TERMINAL USER IDENTIFICATION

CROSS-REFERENCE TO RELATED APPLICATIONS

The present application is related to co-pending and commonly assigned U.S. patent application Ser. No. 10/135,878 entitled "Information Management and Movement System and Method," filed Apr. 29, 2002, Ser. No. 10/642,532 entitled "Centralized Call Processing," filed Aug. 15, 2003, Ser. No. 11/125,842 entitled "Processor-Based Self-Service Terminals Used With Respect To Controlled Environment Facilities," filed May 10, 2005, and Ser. No. 10/720,848 entitled "Systems and Methods for Acquiring, Accessing, and Analyzing Investigative Information," filed Jul. 15, 2005, the disclosures of which are hereby incorporated herein by reference.

TECHNICAL FIELD

The present invention relates generally to controlled environment communications and, more particularly, to providing user identification with respect to controlled environment facility visitation terminals.

BACKGROUND OF THE INVENTION

Prisons, jails, and other detention facilities must often allow visitation of inmates detained therein. However, security must generally be maintained with respect to the inmate for which visitation privileges are being provided. For example, not only must opportunities for the inmate to escape the confines of the detention facility be prevented, but provisions for the continued safety and well being of the visitor must also typically be made. Moreover, opportunities for exchange of certain items between an inmate and visitor must typically be prevented, such as to prevent contraband from being introduced into the detention facility.

Accordingly, many detention facilities have implemented a visitation booth configuration wherein an inmate and corresponding visitor are disposed on opposite sides of a partition, usually including a transparent panel (e.g., LEXAN window), and placed in voice communication via a closed circuit phone system. For example, a visitor may enter a booth, provided in a visitation area of the detention facility for privacy, wherein a wall includes a window looking into a room or corresponding booth in which a inmate to be visited is located. Telephone handsets are provided for each of the visitor and inmate, such that the handsets are coupled in a closed circuit to allow the visitor to speak to and listen to the inmate and vice-versa. A plurality of such booths and visitation phones may be provided to accommodate a plurality of visitors simultaneously.

Figure 1:
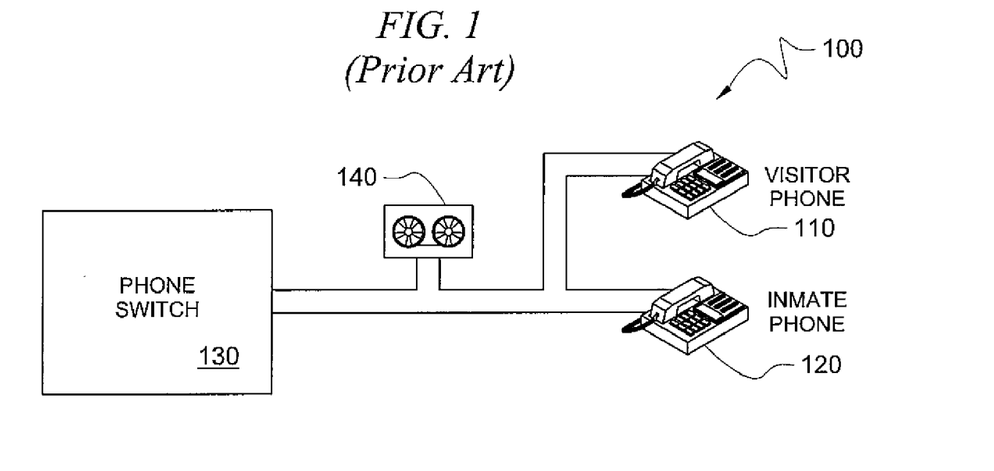
FIG. 1 shows a typical prior art visitation phone system.

Directing attention to FIG. 1, a typical prior art visitation phone system is shown as visitation phone system 100. Visitation phone system 100 includes visitor phone 110 and inmate phone 120, such as may be disposed upon opposite sides of a partition, within corresponding visitation booths, etcetera. Phone switch 130 is coupled to visitor phone 110 and inmate phone 120 to provide loop current thereto. Specifically, visitor phone 110 and inmate phone 120 are coupled in series to a plain old telephone service (POTS) port of phone switch 130. Accordingly, when both visitor phone 110 and inmate phone 120 are lifted off-hook, loop current flows through the phones allowing telephonic communication between visitor phone 110 and inmate phone 120.

The foregoing serial closed circuit configuration of the visitation phones is advantageous because a single telephone service port is utilized in providing communication between the pair of visitation phones (e.g., much like multiple extensions on a single residential telephone line can communicate when the extensions are lifted off-hook). Moreover, as the visitation phones are placed in direct communication with one another, the phones themselves are devoid of keypads for dialing, etcetera, thereby resulting in an inexpensive and easily hardened user terminal.

However, such a visitation phone configuration is not without its disadvantages. For example, the inventors of the present invention have discovered that it is impossible to control communication between the inmate and visitor when communication between phone switch 130 and either of visitor phone 110 or inmate phone 120 is desired. That is, both visitor phone 110 and inmate phone 120 must be off-hook for the loop to be completed, and thus communication between phone switch 130 is not possible between a selected one of visitor phone 110 and inmate phone 120 without the other one of visitor phone 110 and inmate phone 120 also being in communication. Similarly, although it may be possible to provide for recording of visitation conversations relatively easily, such as through connection of recorder 140 (e.g., a loop current activated recording device) serially in the loop, the operation such a recorder is not controllable. Specifically, when visitor phone 110 and inmate phone 120 are lifted off-hook, loop current flows causing recorder 140 to begin recording. However, if the conversation is private, or otherwise should not be recorded, there is nothing short of manual intervention to control recorder 140 not to record the conversation.

Moreover, the inventors of the present invention have discovered that, although recordings of visitation conversations may be made, accurately identifying the parties to the conversation is problematic. For example, although visitors identities may be checked upon entering the detention facility, and background checks may even be performed, there is typically nothing but hand written notes or logs to show what inmate is being visited by the visitor. Similarly, information with respect to which visitation booth or facility was used by an inmate at what time is typically kept in hand written notes or logs. Accordingly, there is nothing to associate the inmate with a recorded conversation except a manual search of paper records to identify the time and facility used by the inmate. This information may then be used to search recorded conversations for one associated with the time and facility used by the inmate. Identifying the recorded conversation associated with a particular visitor is even more problematic because the visitor must first be associated with an inmate and then the records searched as described above with respect to the inmate. Similarly, after identifying a recorded conversation as corresponding to a particular inmate, further searching of paper records is necessary in order to identify the other party to the conversation. Further aggravating the foregoing is the fact that such records are prone to error, inaccuracies, and incompleteness.

BRIEF SUMMARY OF THE INVENTION

The present invention is directed to systems and methods which collect information regarding users of controlled environment visitation terminals for identification of one or more parties to a visitation conversation. For example, embodiments of the invention operate to prevent communication between a resident of a controlled environment facility and a visitor while identifying information is collected and verified.

Thereafter, the resident and visitor may be placed in communication, whilst the identifying information may be utilized for such purposes as associating a recording of the conversation with the resident and/or visitor, issuing an alert to appropriate individuals that a conversation by one or more parties of interest is being conducted, collect investigative information, etcetera. Controlled environment facilities with which embodiments of the present invention may be utilized include, jails, stockades, prisons, and the like (collectively detention facilities), as well as hospitals, nursing homes, camps, and other facilities wherein access to residents and/or ingress/egress to/from the facility is substantially controlled.

User terminals through which visitation communications are provided include terminals such as telephones and multimedia (e.g., audio and image) terminals, such as may comprise a multi-media computer system having a microphone, speakers, and a camera or as may comprise a multi-media kiosk terminal. The user terminals are adapted according to embodiments of the invention to collect or otherwise receive identifying information, such as through keypads, touch screens, radio frequency identification (RFID) readers, fingerprint scanners, iris scanners, retina scanners, and/or the like.

According to an embodiment, residents of a controlled environment facility are assigned personal identification numbers (PINs) which are used to uniquely identify the residents. A resident may be required to input an appropriate PIN, such as using a dual tone multi-frequency (DTMF) keypad of a user terminal, prior to establishing visitation communications. Additionally or alternatively, residents may be assigned an RFID tag, such as may be imbedded in a bracelet which is not removable from the resident's person without destruction, which is required to be read by a user terminal prior to establishing visitation communications. Identification information may additionally be collected with respect to visitors. For example, a visitor may be provided a temporary RFID badge or PIN when checking in for a visit, or may have more permanent identification assigned thereto, wherein such identification is required at the visitation terminal prior to establishing visitation communications.

Embodiments of the invention provide a closed circuit visitation phone system in which a single port of a phone switching system, such as may comprise a call application management system, is used with respect to a pair of visitation phones. The visitation phones are prevented from providing visitation communications between a resident and a visitor, such as through the use of a controllable isolation switch, while at least one of the phones collects identification information with respect to a user thereof. This information is preferably verified, such as by a validation function of the call application management system. If the identification information is properly verified, e.g., the user is someone who has visitation privileges, has not used up their allotted visitation time, is allowed to visit with the other party, and/or the like, control is provided to facilitate a visitation conversation, such as through manipulating the controllable isolation switch.

An advantage of embodiments of the invention is provided through the ability to accurately identify one or more parties to a visitation conversation. Accordingly, recordings of the visitation communication may be uniquely and accurately associated with a particular controlled environment facility resident and/or visitor. Moreover, rich investigative, historical, or other useful information may be generated using embodiments of the invention.

Another advantage of embodiments of the invention is provided through the use of unique visitor identification information, such as the aforementioned PIN or RFID badge. Such unique identification information may not only be utilized in identifying the visitor for visitation communications, but may also be utilized with respect to other goods and/or services, thereby increasing the robustness of investigative, historical, or other information which may be generated using embodiments of the invention.

A further advantage of embodiments of the invention is that communications between a resident and control system and/or a visitor and the control system to obtain identification information is provided with a minimum of communication ports utilized. Specifically, embodiments of the invention facilitate the aforementioned control system communications while utilizing a single control system communication port for a pair of visitation user terminals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 2:
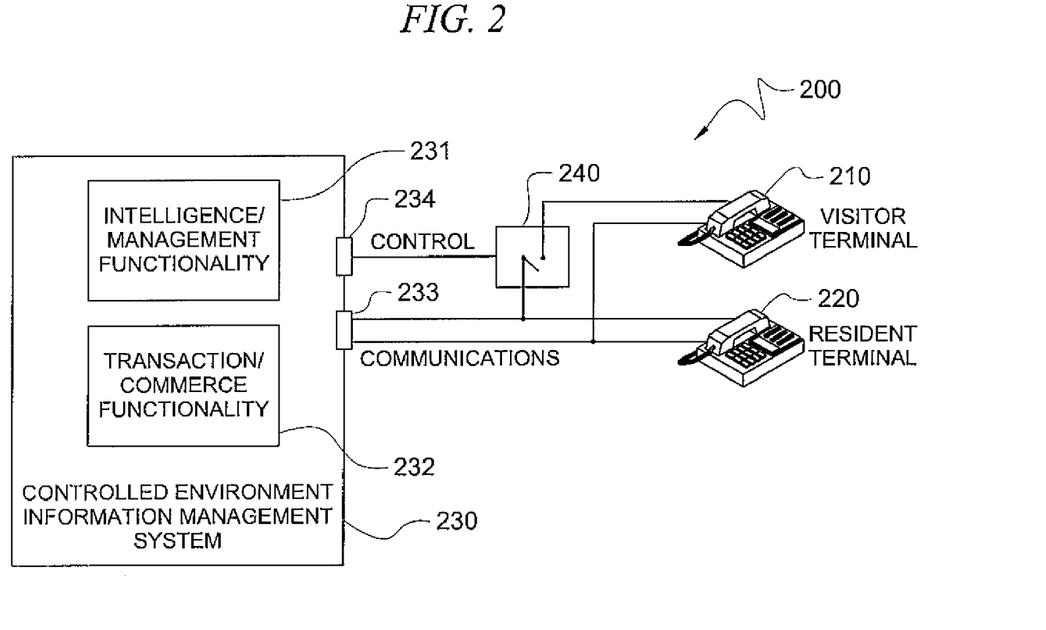
FIG. 2 shows a visitation communication system adapted to provide visitation terminal user identification according to an embodiment of the present invention.

Directing attention to FIG. 2, visitation communication system 200 adapted to provide visitation terminal user identification according to an embodiment of the present invention. As shown in FIG. 2, information management system 230 facilitates communications between visitor terminal 210 and resident terminal 220. Although the illustrated embodiment shows user terminals comprising telephones, it should be appreciated that a variety of user terminal equipment configurations may be utilized according to embodiments of the invention. For example, user terminals utilized according to embodiments of the present invention may include personal computers, personal digital assistants (PDAs), pagers, telephones (wireline and wireless), facsimile machines, kiosks, and the like, coupled through direct links, such as wireline, cable, fiber optic, etcetera, and/or indirect links, such as network links, private branch exchange (PBX) links, etcetera. Moreover, connectivity provided with respect to such user terminals may be provided via direct connections, via indirect connections (e.g., network connections), and combinations thereof. Detail with respect to a user terminal kiosk configuration as may be utilized as a visitation terminal, or otherwise used in association with visitation, according to embodiments of the present invention is provided in the above referenced patent application entitled "Processor-Based Self-Service Terminals Used With Respect To Controlled Environment Facilities."

In accordance with a preferred embodiment of the present invention, controlled environment information management system 230 is adapted to include intelligence/management functionality 231 and transaction/commerce functionality 232. Preferably, intelligence/management functionality 231 provides for collection, storage, and movement of information for managing various operational aspects of the controlled environment facility, such as for the management of personnel, residents, vendors, and resources. Transaction/commerce functionality 232 preferably provides for the instigation and completion of various transactions, such as for requesting and providing goods and services, determining credit worthiness, verifying account balance and status, and providing for payment. Additional detail with respect to controlled environment information management systems as may be utilized in providing visitation terminal communication links and user identification collection is provided in the above referenced patent applications entitled "Information Management and Movement System and Method" and "Centralized Call Processing."

It should be appreciated that use of a robust information management system, such as controlled environment information management system 230, is not required according to embodiments of the invention. Accordingly, embodiments of visitation communication system 200 may utilize a call processing system, providing fewer features than the aforementioned information management system, which is suitable for controlling communication between visitation terminals and collecting user identification information as described herein.

Controlled environment information management system 230, or other call processing system adapted according to the present invention, may be deployed in a number of configurations. For example, controlled environment information management system 230 may be deployed within a controlled environment facility for which visitation services are provide or external thereto. Embodiments of the present invention provide an information management system deployed external to the controlled environment facility and having user terminals and/or other access points deployed within the controlled environment facility. Additionally or alternatively, information management systems may be provided in a distributed topology, such as having server systems, application programs, and/or databases distributed throughout a number of geographic locals, according to embodiments of the present invention. Additional detail with respect to configurations of controlled environment information management systems as may be utilized in providing visitation terminal communication links and user identification collection is provided in the above referenced patent applications entitled "Information Management and Movement System and Method" and "Centralized Call Processing."

Visitor terminal 210 and resident terminal 220 are preferably disposed in appropriate visitation locations. For example, visitor terminal 210 and resident terminal 220 may be disposed upon opposite sides of a partition in a visitation area of a controlled environment facility, within corresponding visitation booths of a controlled environment facility, etcetera. Where visitor terminal 210 and resident terminal 220 comprise multi-media terminals, for example, the visitation terminals may be separated by substantial distances with a substantially typical visitation session (i.e., conducting a conversation while viewing the other party) being conducted.

According to an embodiment of visitation communication system 200, controlled environment information management system 230 provides a single communication port for use by both visitor terminal 210 and resident terminal 220. Accordingly, a relatively large number of visitation terminals and other communication terminals (e.g., telephones for calls placed on the public switched telephone network (PSTN)) (not shown) may be accommodated with a minimum number of communication ports utilized at controlled environment information management system 230. However, in contrast to the prior art configuration of FIG. 1, the visitation terminal pair of FIG. 2 are coupled in a parallel configuration. Accordingly, it is not necessary that both visitor terminal 210 and resident terminal 220 be in communication with each other for communications to be accomplished using only one of these terminals.

For example, visitor terminal 220 and resident terminal 230 may each comprise a telephone terminal and port 233 of controlled environment information management system 230 may comprise a plain old telephone service (POTS) port providing loop current to visitor terminal 220 and resident terminal 230. Because the illustrated configuration does not require both terminals of the visitation terminal pair to be off-hook for communications to be accomplished using one of these terminals, resident terminal 220, for example, may be taken off-hook and a user thereof may communicate with controlled environment information management system 230, such as to interact with a voice response unit (VRU) thereof.

Accordingly, at the start of a visitation session, or at other appropriate times, a resident may take or leave resident terminal 220 off-hook and communicate with controlled environment information management system 230 to provide identification information thereto. For example, the resident may be prompted by a VRU script operable with respect to transaction/commerce functionality 232 to provide the resident's PIN. This information may be provided to intelligence/management functionality 231 for validation or verification. For example, intelligence/management functionality 231 may verify, such as through use of one or more databases in communication therewith, that the resident is allowed visitation privileges, that the resident has not already exhausted an allotted number or time for visitations, that the resident is using an appropriate or authorized visitation terminal for that resident, that the current time is within a visitation window for that resident, etcetera. If the validation or verification is successful, visitation communication with the resident may be authorized.

Verification of a user may utilize information in addition to or in combination with that discussed above. For example, a user may input a PIN to identify the user and then be required to provide additional information, such as a voice sample, a fingerprint, a password, a RFID, etcetera, for use in confirming the user is the user associated with the PIN.

The identification information may be utilized for determining if visitation communication is to be allowed and/or for such purposes as associating a recording of the conversation with the resident and/or visitor, issuing an alert to appropriate individuals that a conversation by one or more parties of interest is being conducted, collect investigative information, etcetera. For example, where an investigator has notified an investigative alert function of intelligence/management functionality 231 that the investigator would like to be notified of, and perhaps allowed to monitor, visitation conversations of a particular individual or particular pairs of individuals, controlled environment information management system 230 may issue an alert to the investigator based upon having identified the individual. Additional detail with respect to issuing such investigative alerts and monitoring communications in association therewith is provided in the above described patent application entitled "Systems and Methods for Acquiring, Accessing, and Analyzing Investigative Information."

In order to facilitate collection of identification information, embodiments of visitor terminal 210 and/or resident terminal 220 are adapted to receive identification information and to transmit that information, or a portion thereof, to controlled environment information management system 230. Directing attention to FIG. 3, user terminal 300, such as may comprise either or both of visitor terminal 210 and resident terminal 220 of an embodiment, is shown. User terminal 300 of the illustrated embodiment comprises a telephone terminal having handset 320 (e.g., providing a speaker and microphone) and hook switch 311. User terminal 300 further includes link 314, such as may be utilized in coupling to controlled environment information management system 230 and/or one or more other user terminals. Link 314 may comprise one or more conductors (e.g., a twisted of a POTS service or a computer network, a coaxial cable of a cable transmission system or a computer network, etcetera), a light pipe (e.g., a fiber optic cable), a wireless link (e.g., a cellular radio frequency link, a wireless local area network (WLAN) link, an infra-red link, etcetera), and/or combinations thereof. It should be appreciated that link 314 may utilize multiple protocols and/or media to provide both visitation communication and transmission of identification information.

Figure 3:
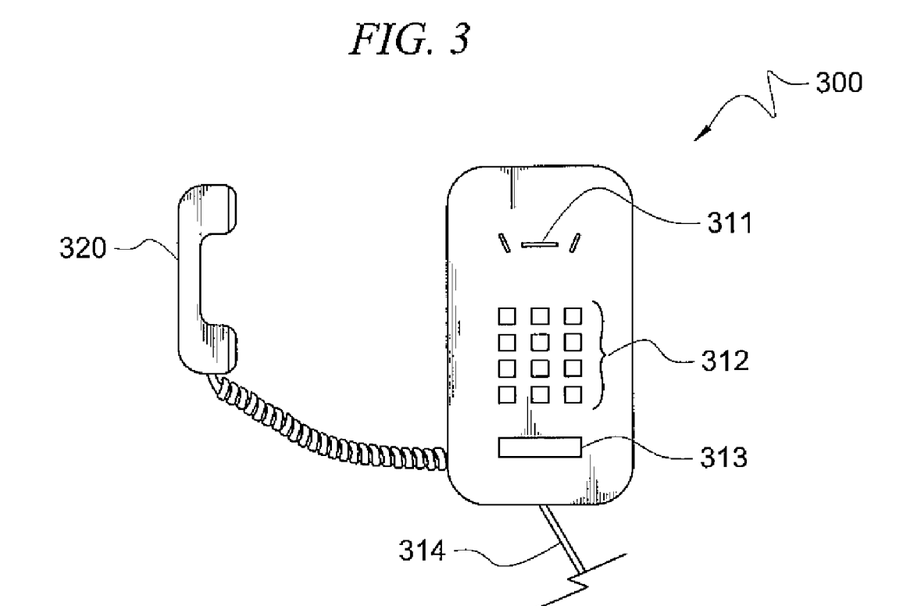
FIG. 3 shows detail with respect to a user terminal adapted according to an embodiment of the present invention.

In contrast to a typical closed circuit visitation phone, user terminal 300 includes keypad 312. Keypad 312 may comprise a DTMF keypad through which a user inputs a PIN number as the aforementioned identification information. Such an embodiment facilitates the use of interface 233 to carry both voice signals (e.g., VRU prompts) and identification information.

Embodiments of the present invention are not limited to use of a keypad, whether DTMF or otherwise, for receiving identification information. Accordingly, user terminal 300 of the illustrated embodiment includes identification information receiver 313 operable in addition to or the alternative to keypad 312 for collecting identification information. Identification information receiver 313 may comprise a touch screen, an alphanumeric keypad, a RFID reader, a fingerprint scanner, an iris scanner, a retina scanner, and/or the like. Identification information collected by identification information receiver 313, or at least a portion thereof, is preferably communicated via link 314 to controlled environment information management system 230. It should be appreciated that such identification information may be communicated using a same link as voice signals, such as using DTMF signaling, modulating the data on a carrier compatible with the link, using pulse coding, etcetera. Alternatively, this identification information may be communicated via link 314 using a different link than voice signals of user terminal 300, such as a digital network link, a wireless link, etcetera.

As an example of the use of identification information receiver 313 to collect identification information according to an embodiment of the invention, users may be associated with unique RFID tags. For example, a resident may be provided with a bracelet having one or more RFID tags disposed therein, wherein the bracelet and the RFID tag used to uniquely identify the resident are destroyed upon removal of the bracelet from the resident. Destruction of the RFID tag upon removal of the bracelet prevents another resident from utilizing the bracelet to misidentify his/herself. Embodiments of the invention may include a second RFID tag within the bracelet which, although not utilized for identifying the resident to systems such as controlled environment information management system 230, may remain operable after removal of the bracelet, such as to facilitate location of the removed bracelet, to determine the identity of the resident originally associated with the bracelet, etcetera. Having been assigned a RFID bracelet according to this exemplary embodiment of the invention, the resident may be required to hold the bracelet in proximity to identification information receiver 313, such as at the beginning of a visitation session and/or periodically throughout the session, for collection of identification information therefrom. Identification information collected by identification information receiver 313 may be in addition to or in alternative to identification information collected by keypad 312 or other sources.

Although the foregoing example described a resident as providing identification information, visitors may be asked to provide identification information for visitation according to embodiments of the invention. For example, a visitor may check-in at a controlled environment for visitation, such as using a self service kiosk as shown and described in the above referenced patent application entitled "Processor-Based Self-Service Terminals Used With Respect To Controlled Environment Facilities." Upon successful check-in (e.g., clearing a background check, being included on an allowed visitors list, not being included on a disallowed visitors list, being present at an appropriate visiting time, being attired appropriately, etcetera), the visitor may be dispensed a temporary RFID badge having a unique RFID tag therein. For this visitation session, this individual may thusly be uniquely identified with the RFID badge and thus may be required to hold the badge in proximity to identification information receiver 313, such as at the beginning of a visitation session and/or periodically throughout the session, for collection of identification information therefrom. Identification information collected by identification information receiver 313 may be in addition to or in alternative to identification information collected by keypad 312 or other sources. Accordingly, visibility of the individual visitor is not lost after a check-in procedure, but rather continues up to and through the visitation session.

Embodiments of the present invention utilize identification information substantially permanently associated with visitors or other individuals in addition to or in the alternative to temporarily assigned identification information. For example, a RFID badge may be permanently assigned to a visitor for identification purposes. Such a badge may be used at the above mentioned kiosk for visitation check-in, such as to confirm visitation is to be allowed, to place the visitor in the visitation queue, etcetera, as well as being used at the visitor terminal to identify the visitor. Where an individual is permanently identified, benefits in addition to the aforementioned expedited check-in may be realized, such as collecting historical information to better tailor services for the individual, to provide incentives through tracking usage of services by the individual, to collect robust investigative information, etcetera.

Preferred embodiments of the invention are adapted to prevent a resident and visitor from communicating before identification information has been collected and/or during collection of identification information. Accordingly, the embodiment illustrated in FIG. 2 includes controllable switch 240 disposed in the communication path. Specifically, controllable switch 240 is disposed to break a connection between visitor terminal 210 and controlled environment information management system 230, thereby interrupting loop current to visitor terminal 210 even when visitor terminal 210 is off-hook.

Controllable switch 240 of the illustrated embodiment is provided control signals by controlled environment information management system 230 via port 234. Port 234 may utilize any of a number of media and/or protocols. For example, in a preferred embodiment of the present invention port 234 comprises a digital network interface, such as an Internet protocol (IP) network (e.g., Ethernet). In such an embodiment, although utilizing a port in addition to the aforementioned port used for communication with and between the user terminals, the port used in providing control signals to controllable switch 240 is a port which is readily available on many host systems. For example, where controlled environment information management system 230 comprises a computer-based host, the aforementioned digital network interface may be present for other purposes.

Although shown as a single switch, controllable switch 240 may comprise a plurality of switches corresponding with a plurality of visitation terminal pairs. For example, controllable switch 240 may comprise a single unit having a plurality of switches therein, wherein the unit is network addressable such that commands sent to the unit's network address selectively control individual switches in off/on positions. In such a configuration, controlled environment information management system 230 can use port 234 to control connection of a plurality of visitation terminals.

In operation according to the illustrated embodiment, a user of resident terminal 220 may place resident terminal 220 off-hook and communicate with controlled environment information management system 230 for providing identification information thereto. However, where controllable switch 240 is in an open state, a visitor at visitor terminal 210 is unable to communicate with the resident. After having verified or validated the resident's identification information, as described above, controlled environment information management system 230 may control controllable switch 240 to enter a closed state, thereby allowing visitation communication between visitor terminal 210 and resident terminal 220. The foregoing operation prevents the visitor and resident from communicating prior to validation or verification, and from being able to communicate while communication between controlled environment information management system 230 and resident terminal 220 is being utilized for identification information collection.

As discussed above, embodiments of the invention operate to collect identification information with respect to a plurality of parties to a visitation communication, such as the visitor and the resident in the foregoing example. Embodiments of the invention may operate to isolate one user terminal (e.g., visitor terminal 210) during collection of one user's identification information (e.g., resident identification information), verify or validate the collected identification information, connect the previously isolated user terminal (e.g., visitor terminal 210), and then collect identification information regarding the user thereof. Such information may be utilized to uniquely identify the second user to the visitation conversation. Moreover, verification or validation processes may be run with respect to this identification information, perhaps to determine if the visitation communication should be allowed to continue, to provide desired alerts, etcetera. Such an embodiment may be advantageous as the switching mechanism remains relatively simple, the visitor may have been pre-validated or verified in a check-in procedure, and/or the resident may be perceived to be the highest risk with respect to attempting to improperly initiate visitation communications. However, embodiments of the present invention are adapted to isolate each user terminal for collection of identification information.

Figure 4:
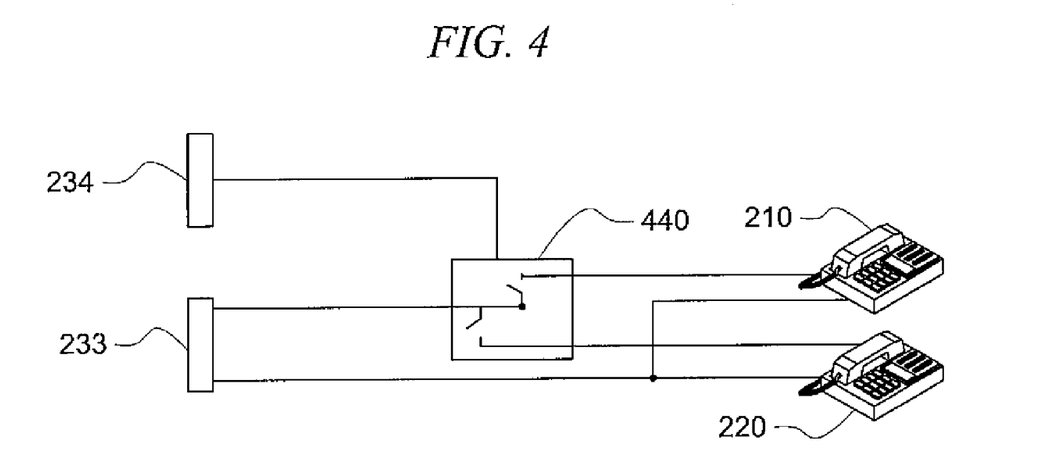
FIG. 4 shows an embodiment adapted to isolate each of a visitor terminal and a resident terminal for collection of identification information.

Directing attention to FIG. 4, an embodiment adapted to isolate each of visitor terminal 210 and resident terminal 220 for collection of identification information is shown. The embodiment of FIG. 4 includes controllable switch 440 having first and second switching elements therein. Accordingly, controllable switch 440 may be controlled to place visitor terminal 210 in communication with controlled environment information management system 230 and isolate resident terminal 220, to place resident terminal 220 in communication with controlled environment information management system 230 and isolate visitor terminal 210, and to place visitor terminal 210 and resident terminal 220 in communication. Controlled environment information management system 230 may, for example, control controllable switch 240 to isolate visitor terminal 210 to collect identification information from resident terminal 220. Thereafter, if the resident identification information passes a validation or verification function, controlled environment information management system 230 may control controllable switch 240 to isolate resident terminal 220 to collect identification information from visitor terminal 210. Thereafter, if the visitor identification passes a validation or verification function, controlled environment information management system 230 may control controllable switch 230 to connect visitor terminal 210 and resident terminal 220 for visitation communication.

Controllable switches, such as those discussed above, may be utilized with respect to coupling devices in addition to or in the alternative to user terminals. For example, an embodiment of the invention utilizes an additional switching element to couple or isolate a loop current controlled recording device to/from a visitation conversation. Accordingly, where the visitation conversation is privileged or otherwise not to be recorded, such as may be recognized by the visitor identification information corresponding to that of the resident's legal counsel, the controllable switch may be controlled such that the recording device remains isolated from the visitation communication.

Although embodiments have been described above with reference to collecting identification information prior to allowing a visitation communication, embodiments of the invention may additionally or alternatively collect identification information during a visitation communication. For example, a resident and/or visitor may be required to periodically provide identification information throughout a visitation communication, to ensure that the parties to the conversation have not changed. In one embodiment, a VRU of controlled environment information management system 230 prompts the parties to provide identification information (e.g., re-entry of a PIN, holding an REID tag in proximity to a reader, etcetera) at various times during the visitation communication. The users may be isolated, such as through use of controllable switches 240 or 440, during such identification information input, or they may be allowed to remain in communication (perhaps unless and until the identification information fails a validation or verification function). The identification information may be carried over the visitation communication links, such as in the form of DTMF tones or a modulated signal (perhaps on a carrier frequency out of the conversation band), or may be carried over separate communication links, such as a separate digital network link.

Moreover, although embodiments have been described with respect to using a controllable switch to isolate user terminals of a closed circuit communication system in association with identification information collection and/or analysis, such controllable switches may be utilized for other or additional purposes according to embodiments of the present invention. For example, controlled environment information management system 230 may execute a timer to determine when a visitation conversation has reached an allowable limit, thereafter controlling a controllable switch to isolate one or more user terminals and thus terminating the visitation conversation. Additionally or alternatively, controlled environment information management system 230 may monitor the line for hook flashes, such as where one of the parties to a visitation communication is attempting to "confuse" the call controller with respect to the status of the visitation conversation, and control a controllable switch to open upon such a condition, thereby effectively beginning a new visitation conversation session when such anomalies are detected.

It should be appreciated that, although embodiments have been described herein with reference to analog telephone connections, the concepts of the present invention may be utilized with respect to any number of communication technologies. For example, embodiments of the present invention may be utilized with respect to voice over Internet (VoIP) communications. In one such embodiment, port 233 of FIG. 2 is associated with a VoIP gateway (e.g., an integrated access device (IAD)) providing digital VoIP communication with one or more functions of controlled environment information management system 230 and analog communication with visitor terminal 210 and resident terminal 220.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled environment visitation communication system comprising:
   one or more visitor terminals and one or more resident terminals, each of the visitor terminals associated with a resident terminal and the associated visitor and resident terminals coupled to a same communication port in the visitation communication system;
   a communication circuit adapted to couple said resident terminal and said associated visitor terminal for visitation communication;
   an isolation circuit disposed in said communication circuit, said isolation circuit controllable to prevent visitation communication between said resident terminal and said associated visitor terminal in association with analysis of identification information collected using at least one of said resident terminal and said associated visitor terminal; and
   a call control system coupled to said communication circuit and operable to analyze said identification information and to control said isolation circuit for allowing said visitation communication between said resident terminal and said associated visitor terminal.

2. The system of claim 1, wherein said communication circuit provides communication between said resident terminal and said associated visitor terminal without said communication between said resident terminal and said associated visitor terminal being placed on a public network.

3. The system of claim 1, wherein said resident terminal and said associated visitor terminal are disposed locally with respect to each other.

4. The system of claim 3, wherein said resident terminal and said associated visitor terminal are disposed on opposite sides of a partition having a viewing portal, said resident terminal being viewable to a user of said associated visitor terminal and said associated visitor terminal being viewable to a user of said resident terminal through said viewing portal.

5. The system of claim 1, wherein said same communication port comprises a single analog telecommunications port.

6. The system of claim 1, wherein said call control system collects said identification information via said same communication port.

7. The system of claim 1, wherein said call control system is coupled to said isolation circuit, to provide control signals thereto, via a data port.

8. The system of claim 7, wherein said data port comprises a network interface.

9. The system of claim 7, wherein said data port is utilized by said call control system for purposes in addition to said providing control signals to said isolation circuit.

10. The system of claim 1, wherein said call control system comprises:
    validation logic to validate said identification information.

11. The system of claim 1, wherein said call control system comprises:
    call recording circuitry controlled at least in part in response to said analysis of said identification information.

12. The system of claim 1, wherein said call control system comprises:
    call recording circuitry recording said visitation communication and at least a portion of said identification information.

13. The system of claim 1, wherein said call control system comprises:
    alert transmission circuitry controlled at least in part in response to said analysis of said identification information.

14. The system of claim 1, wherein at least one of said residential terminal and said associated visitor terminal comprise identification information collection circuitry.

15. The system of claim 14, wherein said identification information collection circuitry comprises a user interface keypad.

16. The system of claim 14, wherein said identification information collection circuitry comprises a radio frequency identification tag reader.

17. The system of claim 16, further comprising:
a radio frequency identification bracelet having a first radio frequency identification tag disposed therein, said first radio frequency identification tag providing said identification information.

18. The system of claim 17, wherein said radio frequency identification bracelet has a second radio frequency identification tag disposed therein, said radio frequency identification bracelet configured to render said first radio frequency identification tag inoperable when said radio frequency identification bracelet is removed from a wearer and said second radio frequency identification tag remaining operable after removal of said radio frequency identification bracelet from said wearer.

19. The system of claim 16, further comprising:
a radio frequency identification badge having a radio frequency identification tag disposed therein, said radio frequency identification tag providing said identification information.

20. The system of claim 14, wherein said identification information collection circuitry transmits said identification information over a same link as said visitation communication between said resident terminal and said associated visitor terminal.

21. The system of claim 14, wherein said identification information collection circuitry transmits said identification information over a different link as said visitation communication between said resident terminal and said associated visitor terminal.

22. The system of claim 1, wherein said resident terminal and said associated visitor terminal comprise telephone terminals.

23. The system of claim 1, wherein said resident terminal and said associated visitor terminal comprise multi-media terminals.

24. A method for providing controlled environment facility visitation communications, said method comprising:
providing a visitation communication system in the controlled environment facility, the visitation communication system comprising one or more visitation user terminals and one or more resident user terminals, each of the visitation user terminals paired with an associated resident user terminal and both paired user terminals coupled to a same port in the visitation communication system;
isolating a visitation user terminal from an associated resident user terminal to prevent visitation communications therebetween, wherein isolating the visitation user terminal comprises controlling a switch to interrupt a communication link of an isolated one of the visitation terminal and the associated resident user terminal, the communication link disposed between the port of the communication host system and the isolated one of the visitation terminal and the associated resident user terminal;
collecting user identification information from at least one of a visitor using said visitation user terminal and a resident using said associated resident user terminal;
validating said user identification information; and
allowing visitation communications between said visitation user terminal and said associated resident user terminal in response to said validating.

25. The method of claim 24, wherein said visitation user terminal and said associated resident terminal are coupled to the same communication port in parallel.

26. The method of claim 24, wherein said user identification information comprises a personal identification number.

27. The method of claim 24, wherein said user identification information comprises information obtained from a radio frequency identification tag.

28. The method of claim 24, further comprising:
storing at least a portion of said visitation communication in association with at least a portion of said identification information to uniquely identify said at least one of said visitor and said resident with said visitation communication.

29. The method of claim 24, further comprising:
alerting a third party to said visitation communication based at least in part on said user identification information.

30. The method of claim 24, wherein said collecting user identification information from at least one of said visitor and said resident comprises collecting user identification information from both said visitor and said resident.

31. The method of claim 30, wherein said allowing visitation communications is in response to validating user information from one of said visitor and said resident.

32. A method for providing control of detention facility visitation communications, said method comprising:
preventing visitation communication between a visitation communication device and an inmate communication device, said visitation communication device and said inmate communication device being disposed within said detention facility and coupled to a same analog port of a detention facility call processing system, wherein preventing visitation communication comprises controlling a switch to disable a communication link between the visitation communication device and the call processing system, wherein the switch comprises a plurality of switches to provide control with respect to a plurality of visitation communication devices;
collecting inmate identification information, said inmate being a user of said inmate communication device;
processing said inmate identification information; and
allowing visitation communication between said visitation communication device and said inmate communication device if a result of said processing indicates said inmate qualifies for visitation.

33. The method of claim 32, wherein said controlling said switch comprises:
transmitting a control signal from a port of said call control system different than said analog port.

34. The method of claim 33, wherein said port of said call control system comprises a network interface.

35. The method of claim 32, wherein said collecting information from said inmate comprises:
prompting said inmate for a personal identification number.

36. The method of claim 32, wherein said collecting information from said inmate comprises:
reading an radio frequency identification tag associated with said inmate.

37. The method of claim 32, further comprising:
collecting visitor identification information, said visitor being a user of said visitation communication device; and
processing said visitor identification information.

38. The method of claim 37, wherein said allowing said visitation communication allows said visitation communication if a result of said processing indicates said inmate and said visitor qualify for visitation.

39. The method of claim 37, wherein said allowing said visitation communication allows said visitation communication to commence prior to said processing said visitor identification information.

40. The method of claim 32, further comprising:
   storing at least a portion of said visitation communication in association with at least a portion of said identification information to uniquely identify said at least one of said visitor and said resident with said visitation communication.

41. The system of claim 1, wherein said paired visitor terminal is disposed remotely from said resident terminal.

42. The system of claim 1, wherein said resident terminal and said paired visitor terminal provide video visitation between residents and visitors.

43. The method of claim 24, wherein said visitation user terminal is disposed remotely from said resident user terminal.

44. The method of claim 24, wherein said visitation user terminal and paired resident user terminal provide video visitation between residents and visitors.

45. The method of claim 32, wherein said visitation communication device is disposed remotely from said inmate communication device.

46. The method of claim 32, wherein said visitation phone and inmate communication device provide video visitation between residents and visitors.

* * * * *